(12) United States Patent
Shadmon

(10) Patent No.: US 8,924,370 B2
(45) Date of Patent: Dec. 30, 2014

(54) EFFICIENT DISTRIBUTED LOCK MANAGER

(75) Inventor: Moshe Shadmon, Palo Alto, CA (US)

(73) Assignee: ORI Software Development Ltd., Tel Aviv (IL)

( * ) Notice: Subject to any disclaimer, the term of this patent is extended or adjusted under 35 U.S.C. 154(b) by 124 days.

(21) Appl. No.: 13/468,717

(22) Filed: May 10, 2012

(65) Prior Publication Data

US 2012/0310881 A1 Dec. 6, 2012

Related U.S. Application Data

(60) Provisional application No. 61/519,809, filed on May 31, 2011.

(51) Int. Cl.
*G06F 17/30* (2006.01)
(52) U.S. Cl.
CPC ................ *G06F 17/30362* (2013.01)
USPC .......................................... 707/704
(58) Field of Classification Search
CPC ............. G06F 17/30362; G06F 17/30171; G06F 17/30008; G06F 17/30351; G06F 17/30359; G06F 2221/2147; G06F 9/526; Y10S 707/99938; Y10S 707/99952; Y10S 707/99939
USPC ......................................... 707/704
See application file for complete search history.

(56) References Cited

U.S. PATENT DOCUMENTS

| | | | |
|---|---|---|---|
| 5,339,427 A | 8/1994 | Elko et al. | |
| 5,596,754 A | 1/1997 | Lomet | |
| 6,523,066 B1 | 2/2003 | Montroy et al. | |
| 6,529,932 B1 | 3/2003 | Dadiomov et al. | |
| 6,708,198 B1 | 3/2004 | Simmons et al. | |
| 7,076,510 B2 | 7/2006 | Brown | |
| 7,337,290 B2 | 2/2008 | Rajamani et al. | |
| 7,343,432 B1 | 3/2008 | Niver et al. | |
| 7,426,653 B2 | 9/2008 | Hu et al. | |
| 7,484,048 B2 | 1/2009 | Whitehouse | |
| 7,844,584 B1 * | 11/2010 | Griess | 707/704 |
| 7,962,458 B2 | 6/2011 | Holenstein et al. | |
| 8,086,579 B1 | 12/2011 | Chandrasekaran et al. | |
| 8,103,642 B2 | 1/2012 | Ho et al. | |
| 8,140,495 B2 | 3/2012 | Carlin et al. | |
| 8,171,028 B2 | 5/2012 | Rousseau et al. | |
| 8,224,977 B2 | 7/2012 | Loaiza et al. | |
| 8,271,437 B2 | 9/2012 | Arcese et al. | |
| 8,539,168 B2 * | 9/2013 | Dice et al. | 711/152 |
| 2003/0093457 A1 * | 5/2003 | Goldick | 709/104 |

(Continued)

FOREIGN PATENT DOCUMENTS

WO  WO 2006/029032 A2  3/2006
WO  WO 2009/007250 A2  1/2009

OTHER PUBLICATIONS

Thomas Schöbel-Theuer, Optional Locking in Distributed Systems, Internet Citation, Dec. 16, 2004.

(Continued)

*Primary Examiner* — Jorge A Casanova
(74) *Attorney, Agent, or Firm* — Oliff PLC

(57) ABSTRACT

In a cluster where multiple database nodes are synchronized by a distributed lock manager, a process that includes one or more messages that are sent from one or more nodes to a distributed lock manager, wherein one or more of said messages are asynchronous lock taken messages.

18 Claims, 2 Drawing Sheets

(56) References Cited

U.S. PATENT DOCUMENTS

| | | | | |
|---|---|---|---|---|
| 2005/0251500 | A1* | 11/2005 | Vahalia et al. | 707/1 |
| 2006/0167921 | A1 | 7/2006 | Grebus et al. | |
| 2006/0225077 | A1* | 10/2006 | Anderson | 718/104 |
| 2008/0059471 | A1* | 3/2008 | Loaiza et al. | 707/8 |
| 2008/0091680 | A1* | 4/2008 | Eshel et al. | 707/8 |
| 2008/0294648 | A1 | 11/2008 | Lin et al. | |
| 2008/0319996 | A1 | 12/2008 | Cook | |
| 2009/0313311 | A1 | 12/2009 | Hoffmann et al. | |
| 2010/0023521 | A1* | 1/2010 | Arcese et al. | 707/8 |
| 2011/0137879 | A1 | 6/2011 | Dubey et al. | |
| 2011/0145499 | A1 | 6/2011 | Ananthanarayanan et al. | |

OTHER PUBLICATIONS

May 31, 2011 International Search Report issued in International Patent Application No. PCT/US2012/040134.

C.J. Date, "An Introduction to Database Systems", vol. 1, Fourth Edition, pp. 422-424, section 18.5 Locking.

Hector Garcia-Molina, Jeffrey D. Ullman, Jennifer Widom, "Database Systems The Complete Book", Second Edition, pp. 986-989.

Hector Garcia-Molina, Jeffrey D. Ullman, Jennifer Widom, Database Systems The Complete Book, Second Edition, Chapter 18, Concurrency Control, section 18.4 "Locking Systems with Several Lock Modes" pp. 905-913.

http://en.wikipedai.org/wiki/Create,_read,_update_and_delete, "Create, read, update and delete," Wikipedia, Aug. 2, 2012, pp. 1-2.

http://en.wikipedai.org/wiki/Data, "Data," Wikipedia, Aug. 7, 2012, pp. 1-4.

http://en.wikipedai.org/wiki/Application_programming_interface, "Application programming interface," Wikipedia, Aug. 7, 2012, pp. 1-8.

http://en.wikipedai.org/wiki/Mysql, "MySQL," Wikipedia, Aug. 9, 2012, pp. 1-12.

http://en.wikipedia.org/wiki/Innodb, "InnoDB," Wikipedia, Jun. 25, 2012, p. 1.

http://en.wikipedia.org/wiki/MyISAM "MyISAM," Wikipedia, May 8, 2012, p. 1.

http://en.wikipedia.org/wiki/Database, "Database," Wikipedia, Apr. 27, 2012, pp. 1-30.

http://en.wikipedia.org/wiki/Database_management_system, "Database management system," Wikipedia, Apr. 27, 2012, pp. 1-12.

http://en.wikipedia.org/wiki/ACID, "ACID," Wikipedia, Apr. 25, 2012, pp. 1-5.

Schwan, Phillip, "Lustre: Building a File System for 1,000-node Clusters", Cluster File Systems, Inc., Proceedings of the Linux Symposium, pp. 380-386, Jul. 23-26, 2003, Ottawa, Canada.

* cited by examiner

EFFICIENT DISTRIBUTED LOCK MANAGER

FIELD OF THE INVENTION

This invention relates to databases and database management systems.

BACKGROUND OF THE INVENTION

Two commonly used methods to scale a database are by a shared nothing approach and a shared disk approach.

To scale by a Shared Nothing Approach, the data is partitioned to multiple partitions, each partition contains a portion of the data and each partition is managed by a single dedicated database server. Scaling is achieved as partitioning reduces the data size for each server, and the usage of additional servers for the new partitions.

As within each server, multiple threads may operate concurrently, the server maintains a lock manager that coordinates between the threads. For example, if two threads are to update the same resource (such as a row or a block), the lock manager may grant update permission to the first thread, when the update of the first thread is done, the lock manager may provide the permission to the second thread. Without the coordination of the lock manager, both threads may update the same resource at the same time whereas these simultaneous updates may lead to erroneous result. If two threads are reading the same data, the lock manager may grant both threads read permission while at the same time prevent a third thread from updating the data. When the two threads complete the read process, the lock manager can provide the third thread the permission to update the data.

Within a database, locks can be granted over different database resources. Examples of such resources are database, table, partition, segment, block and row. In addition, locks can be of different types. For example:

Read Lock—to allow reading the content of a particular resource. This lock is sometimes called a Shared Lock meaning that multiple threads (or processes) can read (share) the resource data concurrently. This lock may prevent a different thread (or process) to update the content of the resource. For example, two threads receive a Read Lock on the same Row such that both threads are provided with the permission to examine the content of the Row concurrently. However, the third thread that requests a Write Lock on the Row is denied, or is being placed on wait until the reading threads released their Read Lock.

Write Lock—it may be provided to allow updating a particular resource or add a new resource to the database. A Write Lock may be provided to a particular thread (or process) such that other threads (or processes) are prevented from acquiring conflicting locks over the same resource. Examples of locks that conflict a Write Lock are a Read Lock and a different Write Lock. A Write Lock is also referred to below as a lock for update as it allows changing the content of a particular resource or adding a new resource to the database. A non limiting example for the usage of a Write Lock is the update of the content of a particular row in the database. Another non limiting example is adding a new row to the database, the process may involve a Write Lock over an empty row (first) and updating the content of the empty row with the new data (second).

Exclusive Lock—to allow a single thread (or a single process) the permission to operate (read and or write) on a resource. For example, a grant of an exclusive lock over a table would let only a single thread the permission to operate with the table data. Even if the thread is reading data, no other thread (or process) may read the data as long as the exclusive lock is granted.

A request for a lock may be issued by a thread or a process that operates over a particular resource and with the purpose of maintaining the integrity of the data and avoiding the corruption of the data.

A thread or a process requesting a lock request can represent a user using the database, a session of the database, a particular Node in the cluster or any other type of process or object that operates over the database data or over a resource of the database.

A request for a lock over a resource by said thread or process can be done when there is a need to operate using the resource data and the type of the lock requested depends on the type of operation. Some non-limiting examples are as follows:

a) When a resource is read, a Read Lock may be used to prevent an update of the resource data while the resource data is being retrieved.

b) When a resource is updated, a Write Lock may be used to prevent other processes from reading or updating the resource data at the same time.

c) When a new resource is added, a Write Lock may be used to prevent other processes from adding or using the same resource at the same time. For example, users are adding data to a database, the database is organized such that the new data is placed in rows, and a Write Lock over an empty row may be used to prevent the usage of the particular empty row for different new data by a different thread or process. In this example, only the process that holds a grant for a Write Lock over an empty row in the database can use the empty row for new data. Once the data is placed in the row, the row is not empty and thus it cannot be considered as an empty row by a different process and even if the Write Lock is being released.

When the thread or process completes operating the resource data, or when the thread or process determines that there is no need to maintain a lock over a particular resource, they may release the lock to allow other conflicting locks of other threads and processes to be acquired.

An explanation of locking types and compatibility is available from C. J. Date, An Introduction to Database Systems, Volume 1, Fourth Edition, Pages 422-424, section 18.5 Locking.

Within the database server software, the Lock Manager is the process that receives the lock requests (from the different threads or processes), analyzes the requests and provides (or denies) the grants.

In addition, the Lock Manager can place a request which can't be granted on a wait list and provide the grant later in time when the request is not conflicting with granted requests. For example, a thread receives a grant for a Write Lock request and a different thread that requests a Read Lock is placed on a wait list. When the first thread releases the lock, the Lock Manager grants the Read Lock to the second thread.

Within this application, we call the executing database server software with its virtual or physical machine a Database Node (or simply a Node). Note—we hereon use the term Node and "server" interchangeably.

A discussion on a Shared Disk Machines and a Shared Nothing Machines is also available by Hector Garcia-Molina, Jeffrey D. Ullman, Jennifer Widom at Database Systems The Complete Book, Second Edition, pages 986-989.

In a Shared Nothing system, all the threads operate within the same Node, and therefore share the same memory space.

The locking requests of each thread may utilize the shared memory in the Node. For example, the request can be placed by the threads on a linked list which is processed by the Lock Manager.

In a Shared Disk Approach, the data is not partitioned. Multiple Nodes are connected to a shared storage and each of the servers can access (read and/or write) the shared data. A shared disk solution is implemented as a cluster of Nodes that share the same data. Scaling is achieved by adding computing power by means of adding Nodes which operate concurrently over the data. If more computing power is needed, additional database servers (Nodes) can be added to the cluster.

Compared to a Shared Nothing Approach, scaling is provided inherently by the database cluster—the database cluster is built such that more computing power can be added (by adding more database servers to the cluster). With a Shared Nothing Approach, scaling is done by the developer, as the data partitioning needs to be tailored by the developer. The partition of the data needs to achieve even distribution of the data among the servers, as well as even distribution of users among the servers. It also needs to consider the composition of the queries. For example, the partitioning should be done such that most queries would be satisfied on a single server. These are difficult tasks, as sometimes there is no good partitioning approach and it involves considerations which are different for each application. In addition, the type of queries may not be known in advance.

An example of the complexity imposed by a Shared Nothing approach is the following: (1) the database contains customers and catalog information. (2) Many of the queries are joining customers and catalog information. (3) To scale, the customer data is partitioned to multiple partitions. However, the developer is now facing the question of where to store the catalog. If the catalog is to be stored on a dedicated server—the queries that join the customers and the catalog info would need to retrieve information from two separate servers—from the server managing the customer information and the server managing the catalog information. If the catalog information is duplicated on each server, every update to the catalog information needs to be executed on each of the servers that maintain the catalog information.

For the developer, the Shared Disk Approach offers a simple automated way to scale. When large data sets are managed by a Shared Disk database, there is no need to partition the data. Multiple servers have read and write access to the data. To scale, more servers are added to the cluster. As each of the Nodes in the cluster may have concurrent processes, each of these servers may have a local lock manager similar to the lock manager described above with respect to the Shared Nothing Approach server. However, a database system that provides a Shared Disk Approach solution needs (in addition to synchronization of multiple threads within each server) to synchronize the lock requests at a cluster level as different nodes may have processes that are processing the same data at the same time. To synchronize the requests of different servers, a Distributed Lock Manager is used. This lock manager synchronizes requests from multiple nodes in a cluster. As the different servers don't have a shared memory space, the lock requests and grants are done by messages that are sent over a network. This process is by far slower than the process of the Local Lock Manager within a server that is based on a shared memory—a process of the lock manager based on a shared memory may run in nanoseconds whereas messages over network may be even measured in milliseconds (depending on the speed of the network).

There is accordingly a need in the art to reduce the time needed to satisfy lock processes that are done to manage a shared disk (and similar) database systems.

Glossary of Terms:

For clarity of explanation, there follows a glossary of additional terms used frequently throughout the description and the appended claims. Some of the terms are conventional and others have been coined:

Database and Database Management System (DBMS) is explained by: Hector Garcia-Molina, Jeffrey D. Ullman, Jennifer Widom at Database Systems The Complete Book, Second Edition. See also C. J. Date, An Introduction to Database Systems, Volume 1, Fourth Edition. See also http://endot-wikipediadotorg/wiki/Database and http://endotwikipedia-dotorg/wiki/Database_management_system (database and Database Management System from Wikipedia).

Node—the Database Management System (DBMS) server software with its virtual or physical machine. We hereon use the term Node and "server" interchangeably. The Node executes the database management software. Two non limiting examples would be a computer server executing the Oracle database software and a computer server executing the IBM DB2 software. A Node provides management of data such that users are provided with the methods and tools (among others) to update and query the data. For example, a Node, executing an Oracle database software such that data manipulation requests (such as Insert, Update, Delete and Select) issued by users trigger processes that update and query data. Cluster (or a Database Cluster)—Multiple Database Nodes that provide management of the data. These Nodes may be connected via a network and may provide management of Shared Data. Shared Data—Data which is being managed by multiple Nodes.

A relational database is a database that conforms to relational model theory. The software used in a relational database is called a relational database management system (RDBMS). In a relational database, data is logically partitioned into tables and is organized as rows within the tables. The physical implementation may be different, for example, rows may be physically stored within blocks within files. Some of the resources of the database may be indexes which are not part of the relational model theory and which may be organized in blocks within files. The examples below may be provided using the logical organization of rows within tables or may be provides using some physical organization such as rows within blocks. However, the processes of the invention are not bound to a particular logical or physical organization.

Lock Manager—a process that receives lock requests from different processes or threads analyzes and manages the requests such that the integrity of data is maintained. In the context of the invention, a Lock Manager may issue particular locks, without explicit lock requests, when it determines that a particular process or a particular Node is interested with the particular lock.

Local Lock Manager (LLM)—a Lock Manager that analyzes and manages the lock requests of different threads (or processes) by utilizing a shared memory space. This Lock Manager and the requesting threads (or processes) exist within the same Node.

A discussion on locking is also available by Hector Garcia-Molina, Jeffrey D. Ullman, Jennifer Widom at Database Systems The Complete Book, Second Edition, Chapter 18, Concurrency Control, section 18.4 Locking Systems with Several Lock Modes pages 905-913.

Distributed Lock Manager (DLM)—a Lock Manager that analyze and manage lock requests of different threads (or processes) of different Nodes. This Lock Manager and the different threads communicate by sending messages over a network. The DLM manages a Cluster of Nodes. The management of a Local Lock manager or a Distributed Lock Manager (together with other processes) maintains the integrity of the data. Some databases maintain compliance to the ACID set of rules. ACID (atomicity, consistency, isolation, durability) is a set of properties that guarantee that database transactions are processed reliably. More details on ACID properties of a database are available at http://endotwikipediadotorg/wiki/ACID (From Wikipedia).

A DLM operates by monitoring the processes in the different Nodes. It analyzes lock requests that are issued from different processes (or Nodes), provides grants to non conflicting requests (for example multiple processes may read the same data at the same time) and sets an order among conflicting requests. For example, a Write Lock is provided to process A, a grant (for read or write request) for process B is delayed until the lock of process A is released.

SQL (from Wikipedia)—sometimes referred to as Structured Query Language is a programming language designed for managing data in relational database management systems (RDBMS). SQL was one of the first commercial languages for Edgar F. Codd's relational model, as described in his influential 1970 paper, "A Relational Model of Data for Large Shared Data Banks". http://endotwikipediadotorg/wiki/SQL-cite_note-codd-relational-model-4

SQL became the most widely used database language. SQL is used also as a data manipulation language (DML) which is a family of syntax elements similar to a computer programming language used for inserting, deleting and updating data in a database. Storage Engine (from Wikipedia)—A Database Engine (or "storage engine") is the underlying software component that a database management system (DBMS) uses to create, read, update and delete (CRUD) data from a database. Most database management systems include their own Application Programming Interface (API) that allows the user to interact with their underlying engine without going through the user interface of the DBMS.

Many of the modern DBMS support multiple database engines within the same database. For example, MySQL supports InnoDB as well as MyISAM and other Storage Engines.

DETAILED DESCRIPTION OF A PREFERRED EMBODIMENT

Figure 1:
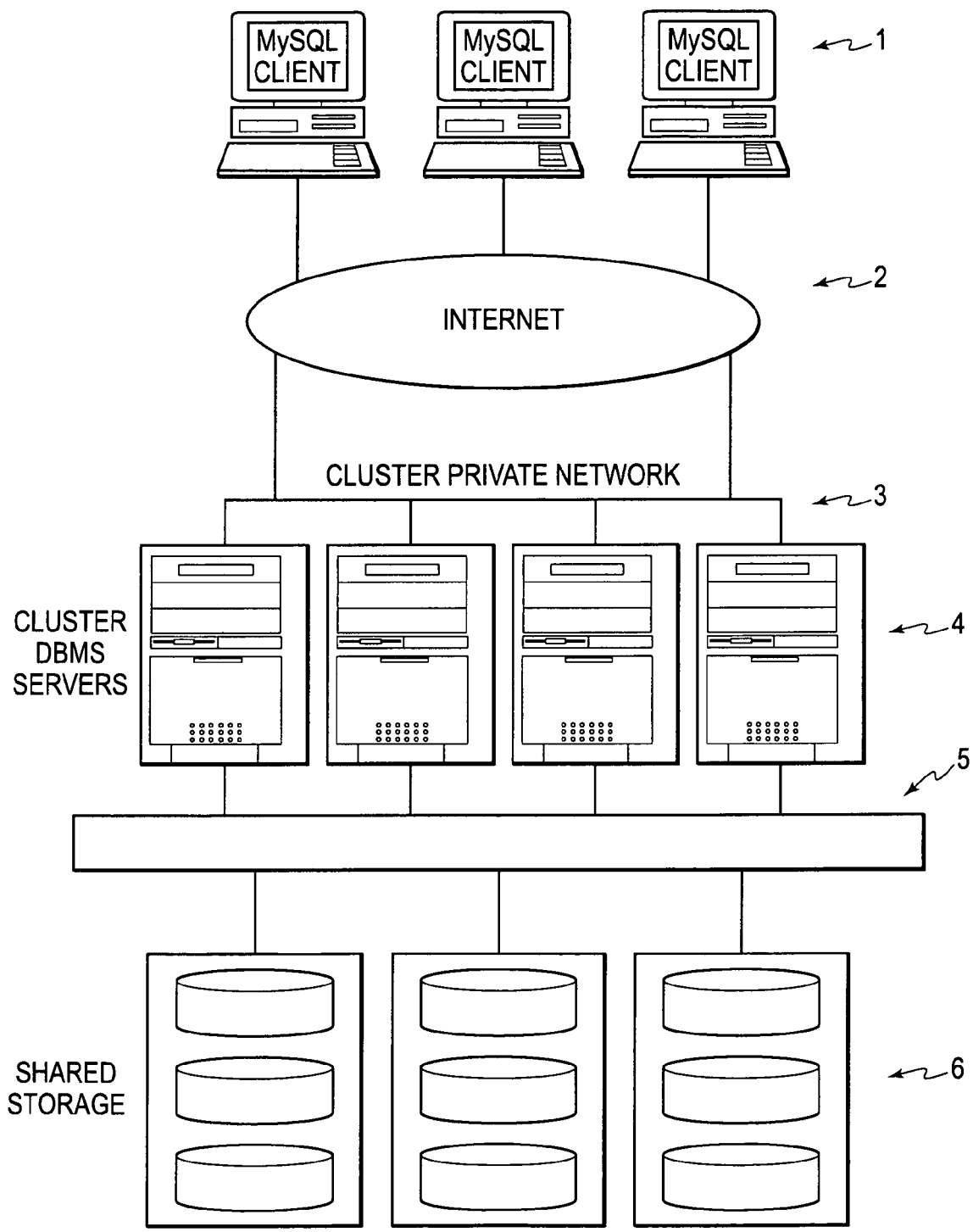
FIG. 1 is a shared disk system where client applications are using multiple database servers that share the same data.

Attention is first directed to FIG. 1 showing DBMS client software executed on local computers 1 which are connected via the interne 2 to a private network 3 that is connected to multiple Nodes 4 which can read and write from a shared storage 6 via a private network 5. As a non-limiting example, the client software 1 can be MySQL client (such as payroll software which is using MySQL as the DBMS), that sends SQL queries to one or more of the MySQL servers 4. Each of the MySQL servers is using a Storage Engine that can read and write data from the shared storage 6.

As the data on the storage 6 is shared among the Nodes 4, in order to maintain the coherency of the data, the Nodes 4 needs to synchronize operations over the shared data. The process of the synchronization is done by a Distributed Lock Manager such as the lock manager 7 in FIG. 2.

Figure 2:
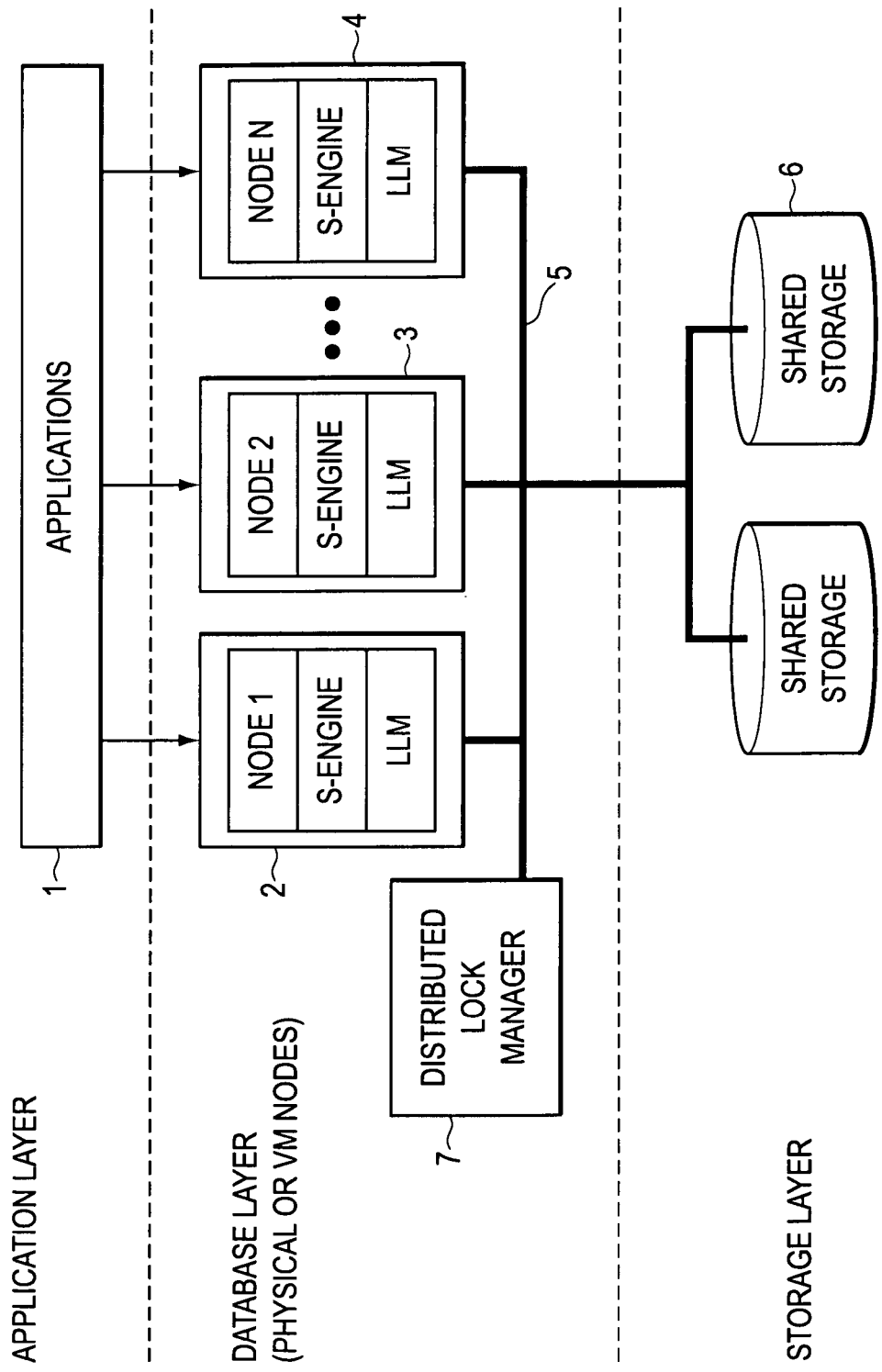
FIG. 2 is a shared disk system showing a Local Lock Manager in each of the database servers and a Distributed Lock Manager that manage the cluster.

FIG. 2 shows applications 1 that are using a cluster of Nodes. Each of the Nodes (Nodes 1, 2, up to N, designated 2, 3 and 4 in the drawing), includes a Storage Engine (marked S-Engine) and a Local Lock Manager (Marked LLM). The storage engine is connected via a network 5, to a shared storage 6. The network 5 is connected to a Distributed Lock Manager 7 such that each of the Nodes may send and receive messages to and from the DLM. When a particular Node needs to read or write data, and in the case that it does not have the grant to operate with the data, it will send a lock request relating a particular resource to the DLM. When the request is received by the DLM, it will be processed and if the request is not conflicting with previous requests relating the resource, which are currently being executed, the DLM will send back to the requesting Node, a message granting the lock request. If the grant can't be issued, DLM will not send a message and the process on the Node will wait to the grant. If the lock status of the particular resource changes. DLM may reprocess the request and send a grant, or if the lock status does not change to allow a grant, the grant is not send and the Node may decide to abort the operation with a dead lock message which is send to the user application which initiated the process. Examples of such resources that may be requested to be locked are databases, tables, data blocks, files, rows and partitions. Examples of types of locks that may be requested are: read locks, write locks and exclusive locks. A Read Lock is a request to read from a particular resource. For example a Read Lock of a table allows the processes on the Node to read data from a particular table knowing that there would be no writes while this lock is maintained. However, multiple Nodes can acquire a read lock at the same time. In the same manner, a read lock of a data block or a row can be provided to multiple processes in the cluster (within a single Node or within multiple Nodes) whereas, if the read lock over the resource have not been released, a write lock (to a different process) will not be granted. When a write lock is granted, the Node is permitted to update the resource (for example the table or the data block) while preventing other Nodes from updating (or reading) the same resource at the same time.

Once a lock is granted to a Node, a Local Lock Manager (such as the LLM of Node 2 which is marked 3 in FIG. 2) may synchronize the lock among the processes or threads (within the Node) that requested the lock. For example, on a particular Node, a thread is doing an Update operation of a particular row of a particular table. This process is evaluated by the LLM to find if another thread on the Node maintains a lock on the row and by the DLM to find if a different Node maintains a conflicting lock. By a different non-limiting example and implementation, the DLM synchronize the lock requests of different processes within different Nodes as well as synchronizing the requests among different processes of the same Node.

If there are no conflicts, the lock is granted by the LLM and DLM indicating a grant of a lock of a particular type on the particular resource. With reference to FIG. 2, and as a non-limiting example, if Node 1 received a grant for a particular lock, the grant of the particular lock is maintained as an internal structure within the LLM of Node 1 showing the details of the resource, the type of the lock and the details of the process that received the grant, whereas the DLM (7 in FIG. 2) maintains an internal structure showing the details of the resource, the type of the lock and the Node ID (which will be Node 1) that received the grant and the details of the process that received the grant.

These data structures are used to evaluate new lock requests for the same resource. When threads release the lock of the resource they notify the LLM that a lock was release and if the lock is released by all threads in the Node, the DLM is notified that the locks over the resource within a particular Node were released. In this particular example, locks in the LLM are organized to include the resource ID and the ID of the thread requesting the lock whereas in DLM locks are organized to include the resource ID and the Node ID.

Since the LLM and the processes of a particular Node share the same memory space, lock requests to the LLM are processes fast: The requesting thread may update a linked list with the details of the lock needed. Once the request is placed on the lined list, the LLM can evaluate the list and if possible, provide the lock. This process may run in nanoseconds. However, as the Nodes and the DLM don't share the same memory space, lock requests to the DLM are based on messages that utilize the network and may be much slower. Even with a fast network, a message may take ½ of a millisecond, which is considerably slower than the shared memory process of the LLM. The known approach of acquiring locks with a DLM is by sending a lock request message from the Node requesting a lock to the DLM. When received at the DLM, the request is analyzed and if the request is not conflicting with the state of the resource (which is held by the DLM), the lock is granted by a message which is send from the DLM back to the Node. This process is synchronous as a message is send and the process on the Node that initiated the request is waiting for a returned reply.

To cope with the performance drawback of lock requests via the network, Asynchronous Lock Taken (hereon ALT) message is suggested. This process is detailed and exemplified below: ALT—a message informing the DLM that a lock over a particular resource was taken. This type of message is used when a Node is able to determine that no other Node is conflicting with this particular lock over the particular resource. In the case of ALT, the requestor does not wait for a reply from the DLM.

The following are examples of processes that can replace the Lock Requests with ALT:
1. When a new resource is created on a particular Node, the Lock Request message is replaced with an ALT message. As the process on the Node created a new resource, there is no need to request a lock and wait for the grant as it can be determined on the Node that there are no conflicting locks of the resource. Examples:
    a. In a process on a Node where a new row is inserted, the Node maintains pre-allocated unique row ids in each table—these row IDs were issued such that they are not shared among different Nodes in the cluster. The thread executing the insert receives the unique ID and thus sends an ALT message to the DLM informing that a lock was taken over the particular row. As the ID is unique (among the Nodes in the cluster), the thread does not need to wait for the grant and continues processing. When the DLM receives the message it updates its internal data structure that a particular Node maintains a particular lock of a particular type over a particular row and there is no need to send a lock grant message to the requesting server.
    b. In a process on a Node where a new block is needed, the Node maintains pre-allocated blocks ids in each table. The thread that needs the block sends ALT message to the DLM. As the pre-allocated blocks ids are unique on each Node in the cluster, the thread does not need to wait for the grant and continues processing. When the DLM receives the message it updates its internal data structure that a particular Node maintains a particular lock of a particular type over a particular block and there is no need to send a lock grant message to the requesting Node.
2. When a Node determines that no other Node maintains a lock over a particular resource, it will use ALT message to get the lock and inform the DLM of the lock state taken (by the Node).

Below is a non limiting example of such process:

In the processing of a particular query, a Node reads a particular data block and once it maintains the block, it reads one or more rows contained in the block. This process may repeat with multiple blocks. In order to synchronize the process in the Cluster, the Node needs to first lock the data block, and before the read of a row from the block, it needs to lock the particular row. These lock processes may trigger lock requests from DLM (for the data blocks and for the individual rows).

When a lock request for a particular block is received by the DLM, it is processed and a grant message may be send to the Node. In order to transform the Lock Requests for the individual rows to ALT messages, DLM replies to the lock request of the block not only with the grant but also with the lock status of the rows which are contained in the block.

Therefore, a lock request for a data block that contains rows may include the information provided below (or part of the information):
    a. A flag indicating if one or more rows in the block are locked.
    b. A list of rows which are contain in the block and are locked.
    c. The type of lock maintained on each row within the block.

When the message with the grant of the block lock arrives at the Node, the process in the Node that requested the block lock is able to continue the processing. As will be demonstrated below, the additional information allows the Node to operate more efficiently as it may leverage the additional information that was provided with the reply to the lock request of the block. Below is an example of such process:

A user issues a query where different rows are selected by a particular process in the Node and are returned to the user. The processes in the Node and the DLM include the following steps:
    a. A request for a shared lock over a particular block (or blocks) that maintain the row (or rows) that are needed to satisfy the query is send to the DLM.
    b. DLM processes the request and determines that a grant can be provided to the request.
    c. DLM tests if any of the rows within the block are held with a lock state by a different Node.
    d. DLM adds information about the rows being locked to the lock grant message (of the block).
    e. The lock grant message (with the additional information) is send to the Node.
    f. The process in the Node that requested the lock receives the grant and reads the data block.
    g. When the data block is available to the process, it is using the information provided with the grant message in order to decide if the rows that are needed needs to be locked, and if a lock request is needed or that the lock can be taken using ALT.
    h. The selected rows copied to a memory buffer that is returned to the user.

The decision if a lock on a particular row is needed and the type of lock to use (as in step g above) is exemplified below:

The block with the row is locked by a shared lock (as detailed in the example above). Therefore, as long as the block lock is not released, no other process will update any of the rows (or add a row) in the block. Note: the Node of this particular example operates such that in order to make an update of a row in a data block, the block needs to be locked with a write lock (a lock that allows adding to the data or updating the data in the block).

Therefore, considering the information about individual rows, provided with the grant of the lock of the block, the processing thread determines that only the rows that are locked for write may require a lock permission from the DLM as only these rows may be updated during the retrieval process by the process that holds the Write Lock. Therefore, the process sends lock request only to rows which are needed and are locked for write. As detailed above, this information (on which row of the block is locked by a different thread) was provided with the grant of the lock (of the block). If no rows are locked for write, the processing thread may provide the rows to the user without initiating a lock.

Alternatively, the processing thread decides to maintain a Read Lock over the rows which are provided to the user (for example, the query specifies to maintain a Read Lock over the retrieved rows for the duration of the transaction). If the information provided with the block lock indicates that the rows (within the block) are not locked by a Write Lock, the processing thread sends ALT message to the DLM to maintain a Read Lock on the selected rows.

ALT messages can be used in many other instances. For example, a node may hold a Write Lock and id downgrading the lock to Read Lock. As the Node is the only holder of the Write Lock it can use ALT message for the downgrade. When SLM receives the message it can provide grants to other non-conflicting requests.

To allow the Nodes in a cluster to work efficiently, it is needed to minimize the usage of requests that require a reply to the requestor. If the DLM determines that a particular resource is being frequently used by only a single Node, DLM may place the resource in an Ownership Mode. The Ownership Mode indicates that only the specified Node is allowed to operate with the resource. That means that only the LLM is needed to provide grants for lock requests (for the resource which is marked at Ownership Mode and for the duration of the Ownership Mode). Ownership Mode can be granted to a particular Node over a particular Resource (such as a table, a block, or a row) or over particular group of resources (such as over all the blocks in a particular segment or all the rows in a particular block). Ownership Mode can be revoked from the Node when a different Node requests a lock over the particular resource (or group if resources). If a different Node requests a lock over the resource, the following process is needed:

1. DLM sends a message to the Node (with the ownership state) to cancel the Ownership Mode of a particular resource.
2. The Node cancels the Ownership Mode and sends a reply message to DLM with the following information:
   a. Acknowledgement that the Ownership Mode was cancelled.
   b. The lock status of the resource.
3. DLM updates its internal structure with the lock status of the Node (previously the owner) and determines if a lock grant can be provided to the Node that requested the lock.

In a similar manner, DLM may determine that a particular resource is frequently read by one or more Nodes. It sets the resource to Read Only Mode. If a lock request message (for type read) is send to the DLM, DLM replies with a lock grant and a flag indicating that this resource is in a read mode. The Read Only Mode for the resource is set in the Node such that as long that the Node does not need to acquire a lock that conflicts with the Read Lock (such as a Write Lock), the Node does not need to send messages to the DLM for that particular resource. If a process in the Node needs a conflicting lock (such as a Write Lock) over the resource, it will send a lock request to the DLM. In that case, DLM will send a message to all the Nodes that were notified of the Read Only Mode of the resource. Each of these Nodes would cancel the Read Only Mode and reply with a message that includes the lock state of the particular resource. Once all the relevant Nodes replied, the DLM will update its internal structure with the information received and analyze the new lock request to determine if the requested lock can be granted.

When an Ownership Mode or a Read Only Mode over a particular resource is cancelled, The Nodes change the mode over the particular resource such that new lock requests needs to be synchronized with the DLM. When the relevant Nodes confirm the mode change, they may send a message to the DLM which may include the information about the locks held over the particular resource at the time of the change. The DLM will use the information to construct an internal structure to reflect the locks being held. This process provides the DLM with the information needed to process new lock requests.

The DLM, considering the lock state of particular resources, may dynamically switch the mode to Ownership Mode or Read Only Mode. When conflicting requests are send to the DLM, the DLM may dynamically cancel the Ownership Mode or Read Only Mode.

The DLM, by providing particular lock states to Nodes, may implicitly or explicitly provide the Nodes with the ability to issue ALT requests on related resources. Below are some non-limiting examples:

a. If a Node maintains Ownership Mode on a particular block, unused rows of that block can be locked for update by the Node with the ownership mode. The Node will issue ALT message to DLM to inform the DLM that the particular rows are locked for update.
b. If a particular data block is maintained in Read Only Mode within one or more Nodes, the DLM may indicate to the first Node that received the Read Only Mode message that it is granted with the permission to lock for update unused rows of the block.
c. If a Node maintains a lock for update on a data block, the Node is also granted with the permission to lock for update unused rows in the block.
d. If multiple Nodes are holding a Read Lock on a data block, the DLM may grant one of the Nodes permission to lock for update unused rows in the block.

These examples demonstrate that within a cluster, a particular Node (or a thread or a process within a Node) is able to grant itself a lock on a particular resource without the need to wait for reply from the distributed lock manager. This process is synchronized among the Nodes of the cluster such that if a particular Node is able to grant itself a lock, other Nodes need to send a message to the DLM and wait for reply from the DLM for conflicting requests.

In one embodiment the DLM manages the distribution of new blocks between the different Nodes in the cluster. A new block may be used by a Node as a container for new Rows which are added to the database data by the users. An example to a process that adds a new row to the database is a process executing an Insert statement, the Insert statement is a user request specified in SQL to instruct the database management software to add a new row to a particular data table.

Therefore, when a Node processes requests to add new rows to the database data, it requests one or more blocks to accommodate the new rows. This request is send to the DLM. The DLM manages the distribution of blocks among the Nodes of the cluster such that every Node receives unique blocks. Therefore, a request from a Node to the DLM to provide a block that will be used as a container for new rows that are to be added to the database, is satisfied by the DLM by providing a new (and unique, one or more) block id, a Write Lock for the requesting Node on the particular block and a Write Lock for the requesting Node on all the rows that can be placed in the block. By this process, if a Node is using a block that was provided by the DLM as a container for new rows, there is no need to send a lock requests to the DML for the particular block and there is no need to send a lock request to the DML for the particular rows that are to be added in the block, as these locks were granted when the DML distributed the block to the Node.

The invention claimed is:

1. A method for increasing locking efficiency in a cluster of database nodes that are synchronized by a distributed lock manager (DLM), comprising:
    determining that a node of the cluster of database nodes requires a lock on a resource;
    determining that no other node of the cluster of database nodes conflicts with the lock required on the resource;
    determining whether locking the resource can be performed using an asynchronous lock taken (ALT) message based on additional information received from a previous lock request, the additional information including a locking state of the resource;
    sending an ALT message from the node to the DLM; and
    locking the resource for the node without the node needing to receive a response from the DLM.

2. The method of claim 1, wherein
    the resource is a data block, and
    the additional information includes information about a lock state of a row or rows contained in the data block.

3. The method of claim 1, wherein the additional information comprises: information that allows the node to determine if the node can lock another resource by sending an ALT message from the node to the DLM, without the node needing to receive a response from the DLM.

4. The method of claim 3, wherein
    the resource is a data block and the other resource is a row.

5. The method of claim 3, wherein
    the resource is a block and the other resource is a row contained in the block.

6. The method of claim 1, further comprising:
    distributing, in a cluster where multiple database nodes are synchronized by a distributed lock manager, resources among nodes of the cluster,
    wherein:
        said resources are used as containers for other resources, and
        said distribution step further distributes grants of locks.

7. The method of claim 6, wherein said resources are blocks and said other resources are rows.

8. The method of claim 7, wherein the resource is a block.

9. The method of claim 7, wherein the resource is at least one row.

10. The method of claim 7, wherein the resource comprises at least one block and at least one row.

11. The method of claim 6, wherein the resource is a resource of a shared disk that is shared by the cluster of database nodes.

12. The method of claim 6, wherein the resource is a target resource.

13. The method of claim 6, wherein the resource comprises a uniquely assigned resource and a target contained resource.

14. The method of claim 1, wherein
    the lock is a lock by a particular thread or process; and
    the DLM issues the lock without an explicit lock request.

15. The method of claim 14, wherein the thread or process is a thread or process of a shared disk.

16. The method of claim 1, further comprising:
    determining that another node of the cluster of database nodes requires a lock on the resource; and
    granting a read-only mode to the other node for the resource, while the node has also been granted the read-only mode to the resource such that, while the other node retains the read-only mode, the other node may read the resource without needing to request the lock from the DLM, and the other node may not write to the resource.

17. A system for increasing messaging efficiency in a cluster of database nodes that are synchronized by a distributed lock manager (DLM), the system comprising:
    a computer server managing a node of the cluster of database nodes;
    wherein the computer server is configured to perform the following steps:
        determining a lock on a resource is required;
        determining that no other node of the cluster of database nodes conflicts with the lock required on the resource;
        determining whether locking the resource can be performed using an asynchronous lock taken (ALT) message based on additional information received from a previous lock request, the additional information including a locking state of the resource;
        sending an ALT message from the node to the DLM; and
        locking the resource without needing to receive a response from the DLM.

18. The system of claim 17, further comprising:
    sending an initial lock request for the resource from the node to the DLM, prior to locking the resource for the node; and
    responding to the initial lock request for the resource by sending a lock grant message from the DLM to the node, wherein
        the resource is a block, and
        the lock grant message includes information allowing the node to lock unused rows within the block without the node needing to make subsequent requests to the DLM after receiving the lock grant message.

* * * * *